(12) United States Patent
Hong et al.

(10) Patent No.: US 10,313,332 B2
(45) Date of Patent: Jun. 4, 2019

(54) METHOD OF PERFORMING ONE-TIME PASSWORD (OTP) AUTHENTICATION USING COLOR CODE AND OTP AUTHENTICATION SERVER USING COLOR CODE

(71) Applicant: RESEARCH & BUSINESS FOUNDATION SUNGKYUNKWAN UNIVERSITY, Suwon-si (KR)

(72) Inventors: Kwang-Seok Hong, Suwon-si (KR); Sang Min Park, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 108 days.

(21) Appl. No.: 15/251,033

(22) Filed: Aug. 30, 2016

(65) Prior Publication Data

US 2017/0078278 A1 Mar. 16, 2017

(30) Foreign Application Priority Data

Sep. 16, 2015 (KR) .......................... 10-2015-0130746

(51) Int. Cl.
*H04L 29/06* (2006.01)
*H04W 12/06* (2009.01)

(52) U.S. Cl.
CPC ...... *H04L 63/0838* (2013.01); *H04L 63/0853* (2013.01); *H04W 12/06* (2013.01)

(58) Field of Classification Search
CPC . H04L 63/0838; H04L 63/0853; H04W 12/06
See application file for complete search history.

(56) References Cited

U.S. PATENT DOCUMENTS

| 2007/0230810 | A1* | 10/2007 | Kanatsu | G06K 9/00456 382/243 |
| 2008/0052245 | A1* | 2/2008 | Love | G06F 21/36 705/76 |
| 2009/0067627 | A1* | 3/2009 | Hogl | G06F 21/84 380/243 |

(Continued)

OTHER PUBLICATIONS

Sushmashree ("Color Code Based Authentication & Encryption," International Journal of Advanced Research in Computer and Communication Engineering, vol. 4, Issue 5, May 2015, pp. 403-404).*

(Continued)

*Primary Examiner* — Luu T Pham
*Assistant Examiner* — James J Wilcox
(74) *Attorney, Agent, or Firm* — NSIP Law

(57) ABSTRACT

A method of performing one-time password (OTP) authentication using a color code is provided. The method includes generating, by an OTP terminal and an authentication server, an OTP using a reference time, generating, by the OTP terminal, a color code corresponding to a binary code representing the OTP, displaying, by a display device, the color code, obtaining, by a camera, the displayed color code, decoding, by the authentication server, the obtained color code into the color code and generating a password which refers to the decoded binary code, and performing, by the authentication server, authentication by comparing the generated OTP and the password.

21 Claims, 20 Drawing Sheets

(56) References Cited

U.S. PATENT DOCUMENTS

| | | | |
|---|---|---|---|
| 2009/0254572 A1* | 10/2009 | Redlich | G06Q 10/06 |
| 2010/0310160 A1* | 12/2010 | Nakajima | H04N 1/6019 |
| | | | 382/162 |
| 2011/0113245 A1* | 5/2011 | Varadarajan | G06F 21/34 |
| | | | 713/168 |
| 2011/0197266 A1* | 8/2011 | Chu | H04L 9/3228 |
| | | | 726/5 |
| 2012/0171997 A1* | 7/2012 | Knapp | G06F 21/35 |
| | | | 455/411 |
| 2012/0240204 A1* | 9/2012 | Bhatnagar | G06F 21/35 |
| | | | 726/5 |
| 2012/0243682 A1* | 9/2012 | Hogl | G06F 21/84 |
| | | | 380/208 |
| 2013/0124855 A1* | 5/2013 | Varadarajan | G06Q 20/3276 |
| | | | 713/155 |
| 2013/0275308 A1* | 10/2013 | Paraskeva | G06Q 20/32 |
| | | | 705/71 |
| 2013/0333006 A1* | 12/2013 | Tapling | G06F 21/42 |
| | | | 726/6 |
| 2013/0333008 A1* | 12/2013 | Tapling | H04L 63/04 |
| | | | 726/7 |
| 2014/0041000 A1* | 2/2014 | Rolfe | H04L 63/04 |
| | | | 726/5 |
| 2014/0346231 A1* | 11/2014 | Al-Omari | G06K 7/1417 |
| | | | 235/462.04 |
| 2015/0020181 A1* | 1/2015 | Iwata | G06F 21/32 |
| | | | 726/7 |
| 2015/0074795 A1* | 3/2015 | Hwang | G06F 21/36 |
| | | | 726/18 |
| 2015/0106275 A1* | 4/2015 | Wolfs | G06Q 20/20 |
| | | | 705/72 |
| 2015/0215312 A1* | 7/2015 | Cesnik | H04L 9/3271 |
| | | | 726/9 |
| 2015/0350520 A1* | 12/2015 | Yamashita | G06F 21/36 |
| | | | 348/207.11 |
| 2016/0036807 A1* | 2/2016 | Knauss | G06F 16/9535 |
| | | | 726/7 |
| 2018/0211021 A1* | 7/2018 | Negi | H04L 9/0866 |

OTHER PUBLICATIONS

Aryachandra ("Secure Color QR Codes," IOSR Journal of Computer Engineering, 2014, pp. 77-85).*

Longhua "A novel design of OTP-based authentication scheme using smart phones and 2-D barcodes for the visually impaired," Jul. 24-26, 2012, i-CREATe '12 Proceedings of the 6th International Conference on Rehabilitation Engineering & Assistive Technology, Article No. 8 , pp. 1-4.*

* cited by examiner

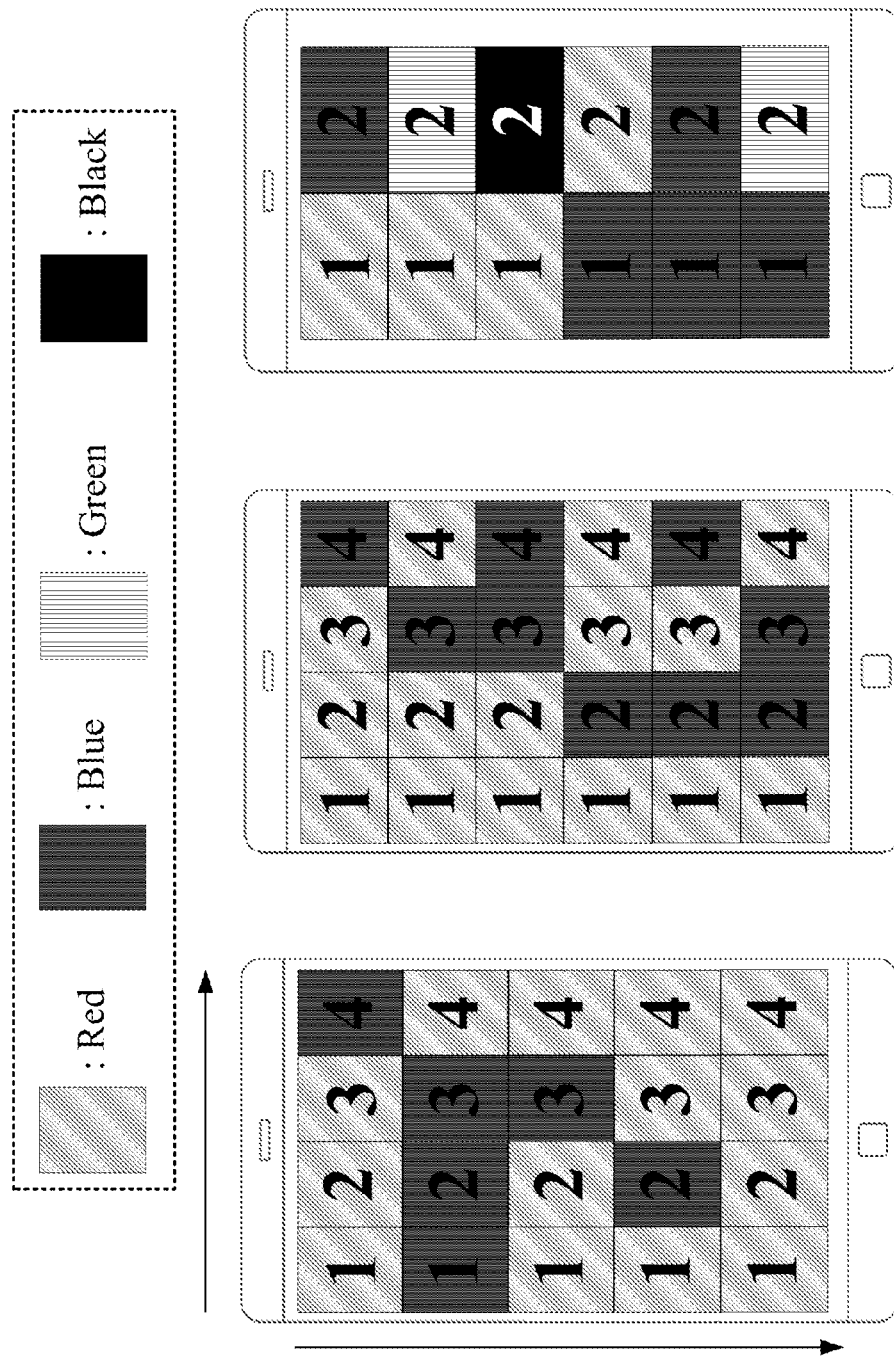

| BINARY NUMBER | TIME PERIOD | COLOR |
|---|---|---|
| 0 | A | Red |
| 1 | A | Blue |
| 0 | B | Blue |
| 1 | B | Red |

FIG.16A

| BINARY CODE | TIME PERIOD | COLOR |
|---|---|---|
| 00 | A | Red |
| 01 | A | Blue |
| 10 | A | Green |
| 11 | A | Black |
| 00 | B | Yellow |
| 01 | B | White |
| 10 | B | Purple |
| 11 | B | Black |

FIG.16B

METHOD OF PERFORMING ONE-TIME PASSWORD (OTP) AUTHENTICATION USING COLOR CODE AND OTP AUTHENTICATION SERVER USING COLOR CODE

CROSS-REFERENCE TO RELATED APPLICATION

This application claims the benefit under 35 U.S.C. § 119(a) of Korean Patent Application No. 10-2015-0130746, filed on Sep. 16, 2015, in the Korean Intellectual Property Office, the entire disclosure of which is incorporated herein by reference for all purposes.

BACKGROUND

1. Field

The following description relates to an authentication method based on a one-time password (OTP).

2. Discussion of Related Art

A one-time password (OTP) is used for a user authentication method which a random number is generated randomly. OTP is proposed in order to overcome a security weak point generated due to the repeated use of the same password. Recently, a service providing a password in the form of a smart phone application instead of a separate OTP generator has also been introduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing one-time password (OTP) authentication using a color code, including: generating, by an OTP terminal and an authentication server, an OTP using a reference time; generating, by the OTP terminal, a color code corresponding to a binary code representing the OTP; displaying, by a display device, the color code; obtaining, by a camera, the displayed color code; and performing, by the authentication server, authentication by comparing the generated OTP and a password represented by the color code.

In another aspect, there is provided an OTP authentication server using a color code, including: an OTP generation device configured to generate an OTP according to a reference time; a communication module device configured to receive an image generated by obtaining a display screen on which a color code is displayed; a storage device configured to store a code table including a color for matching to a binary number or a binary sequence; and a central processing unit (CPU) configured to extract the color code from the image, convert the color code into a series of binary codes using the code table, and perform authentication based on whether the series of binary codes correspond to the OTP.

In still another aspect, there is provided an OTP terminal, comprising: a storage device configured to store a first code for generating an OTP, a second code for converting the OTP into a color code, and a code table including a color matching a binary number or a binary sequence; a CPU configured to generate the OTP based on a reference time using the first code, convert a binary sequence representing the generated OTP using the second code and the code table into a color code configured as a series of color values, and transmit the color code to a display device; and the display device configured to display the series of color values at a specific region according to a reference sequence.

Other features and aspects will be apparent from the following detailed description, the drawings, and the claims.

BRIEF DESCRIPTION OF THE DRAWINGS

FIGS. 11A-11C illustrates an embodiment of a screen outputting color codes in a user terminal;

FIGS. 16A and 16B illustrates an embodiment of code tables in which binary codes and color codes are matched;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
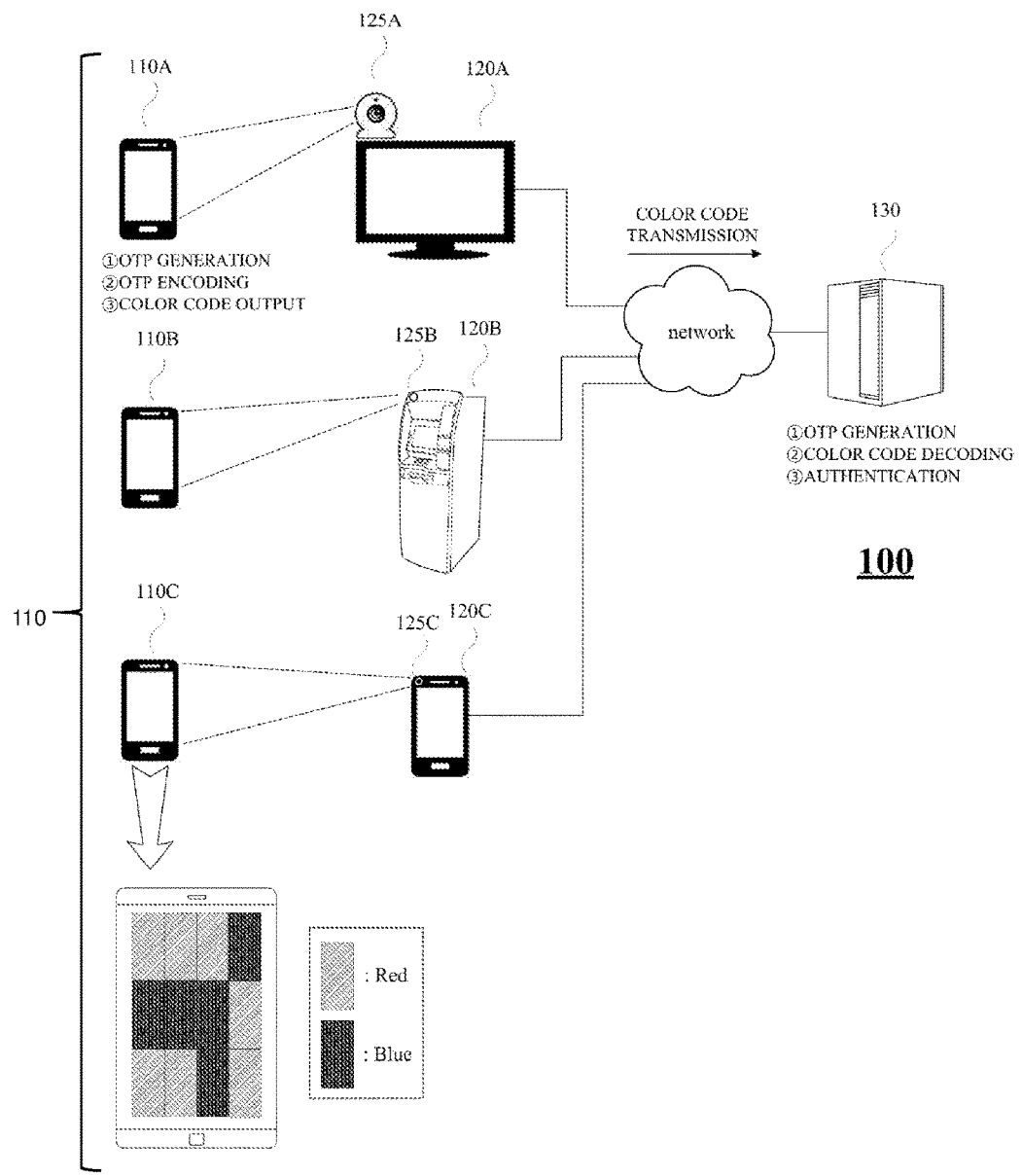
FIG. 1 is a block diagram illustrating an embodiment of a configuration of a one-time password (OTP) authentication system using a color code.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Hereinafter, one-time password (OTP) technology using a color code will be described in detail with reference to the accompanying drawings.

First, an operation of generating an OTP will be briefly described. The OTP is generated using a time-based OTP (hereinafter, TOTP) algorithm, and the TOTP algorithm is generated based on a hash-based message authentication code (HMAC)-based OTP (hereinafter, HOTP) algorithm (HMAC-SHA-1). The HMAC-SHA-1 is a HMAC-based cipher generation algorithm, and generates a new cryptogram using a key value and content to be encrypted as a parameter in a SHA-1 hash function. The HMAC is a method of confirming data integrity using a cryptographic hash function and a secret key. The HOTP is represented as the following function.

$$HOTP(K,C)=Truncate(HMAC\text{-}SHA\text{-}1(K,C))$$

The HOTP may be generated by truncating a predetermined number of digits after substituting K representing the key value and C which is a counter value into the HMAC-SHA-1 function. The TOTP may be a password obtained by substituting C in the HOTP with a combination of T which is a variable of time and the secret key. T may be represented by $T=(Current\ Time-T_0)/X$. Here, $T_0$ is an initial value of a counter time, and X represents a change period of the OTP. For example, X may be 30 seconds.

As a result, as described above, the generation of the OTP may be performed by using a specific time or time period as the variable. An OTP generator (e.g., a token) and an authentication server performing authentication should generate the same OTP. Accordingly, the variable, which is time used in the OTP generator, and the variable, which is time used in the authentication server, may be the same value (same period).

FIG. 1 is a block diagram illustrating an example of a configuration of a one-time password (OTP) authentication system 100 using a color code.

An OTP terminal 110 may generate an OTP, convert the OTP represented by a series of characters into a predetermined color code, and output the converted OTP. The OTP terminal 110 may be a device such as a computer device including a display device, a personal computer (PC) connected to a monitor, a smart phone, a tablet PC, or smart watch. In FIG. 1, an example in which the OTP terminal 110 is a smart phone is illustrated. The smart phone may generate an OTP through a specific application, and output a color code corresponding to the generated OTP.

The OTP may be implemented as various characters, but it is assumed that the OTP is configured as a 6-digit decimal number for convenience of explanation. In a computer device, data is expressed by a specific code. For example, text data may be represented by a code such as Unicode or ASCII code. The computer device may identify the ASCII code as an array of binary numbers. Meanwhile, a number may be represented in various manners in a computer. A number may be represented by a series of binary numbers. Accordingly, the 6-digit decimal number configuring the OTP may be represented by a series of binary numbers. As such, a binary number representing the OTP may be referred to as a binary code.

The OTP terminal 110 may encode (convert) the binary code into a color code. An example of a color code displayed on a display device of the OTP terminal 110 is illustrated in a lower illustration of FIG. 1. A method of converting the binary code into the color code may vary. The method will be described hereinafter.

Three examples regarding the authentication of an OTP using a color code are illustrated in FIG. 1. The examples shown in FIG. 1 are merely examples, and embodiments are not limited thereto may be varied.

In a first example, of FIG. 1, an OTP terminal 110A may first generate an OTP, encode the generated OTP into a color code, and finally output the color code on a screen. A computer device 120A may obtain the screen of the OTP terminal 110A on which the color code is displayed through a connected (embedded) camera 125A. The computer device 120A may transmit an image including the screen of the OTP terminal 110A to an authentication server 130. Through this operation, the color code corresponding to the OTP may be transmitted from the OTP terminal 110A to the authentication server 130.

The computer device 120A may be a PC operated by a user. For example, the user may perform user authentication using the color code when performing a financial transaction such as Internet banking or a card payment through the computer device 120A. Further, the computer device 120A may be a PC arranged in an off-line store. For example, the user may perform the user authentication using the color code in a process of buying a product and performing a card payment in the off-line store. However, embodiments are not limited thereto.

The authentication server 130 may generate the OTP using the same time period (time variable) as the OTP terminal 110A. Various algorithms may be used for generating the OTP. Generally, a time used for generating the OTP may be a predetermined time period as one variable. After this, the authentication server 130 may extract the color code in image data transmitted through a network, and decode the extracted color code into a series of binary numbers. Finally, the authentication server 130 may determine whether the series of binary numbers decoded from the image data and the generated OTP are matched by comparing them. When the decoded series of binary numbers and the OTP match, the authentication server 130 may determine that the authentication is succeeded. In some cases, the authentication server 130 may convert the color code into the OTP configured as a number and then perform authentication by comparing the converted OTP (the binary code representing the OTP) and the generated OTP (the binary code representing the OTP). The authentication server 130 may perform authentication by comparing values obtained by decoding the color code and the generated OTP. When the authentication is successful, the authentication server 130 may transmit an authentication success result to the computer device 120A.

In other examples of FIG. 1, operations of OTP terminals 110B and 110C, computer devices 120B and 120C, and the authentication server 130 may be the same as those of the OTP terminal 110A, the computer device 120A, and the authentication server 130, respectively.

In a second example, of FIG. 1, the OTP terminal 110B may first generate an OTP, encode the generated OTP into a color code, and finally output the color code on a screen. The computer device 120B may be a device such as an automated teller machine (ATM) device. The computer device 120B may obtain the screen of the OTP terminal 110B on which the color code is displayed through an embedded camera 125B. The computer device 120B may transmit image data including the screen of the OTP terminal 110B to the authentication server 130.

For example, when the user visits bank premises and remits or withdraws money through an ATM device, the OTP terminal 110B may output the color code corresponding to the OTP on the screen of the OTP terminal 110B, and the computer device 120B may obtain a corresponding screen through the camera 125B and transmit the obtained screen to the authentication server 130. After this, the authentication server 130 may perform authentication by comparing the generated OTP and a series of binary numbers decoded from the image data. When the authentication is successful, the authentication server 130 may transmit the authentication success result to the computer device 120B.

In a third example of FIG. 1, the OTP terminal 110C may generate an OTP, encode the generated OTP code into a color code, and finally display the color code on a screen. The computer device 120C may be a mobile device such as a smart phone. The computer device 120C may obtain the screen of the OTP terminal 110C on which the color code is displayed through an embedded camera 125C. The computer device 120C may transmit image data including the screen of the OTP terminal 110C to the authentication server 130. The authentication server 130 may decode the color code which is received, and perform authentication by comparing the decoded color code and the generated OTP.

For example, the OTP terminal 110C of the user may display the color code in a process of performing user authentication such as a card payment after the user purchases a product in an off-line store. The computer device 120C used in the off-line store may obtain the color code displayed on the screen of the OTP terminal 110C, and transmit the obtained color code to the authentication server 130. The authentication server 130 may perform authentication by comparing values obtained by decoding the color code and the generated OTP. Although not shown in FIG. 1, when the authentication is successful, the authentication server 130 may transmit the authentication success result to the computer device 120C. Alternatively, the authentication server 130 may transmit the authentication success result to a service server managed by a bank or a card company. When the authentication is successful, the service server may approve a payment paid by the user.

Alternatively, when a user A transfers a predetermined amount of money to a user B, the user A may output a color code to the OTP terminal 110C, and the user B may obtain the color code output on the screen of the OTP terminal 110C using the computer device 120C which is his/her own mobile device and transmit the obtained color code to the authentication server 130. The authentication server 130 may perform authentication by comparing values obtained by decoding the color code and the generated OTP. Although not shown in FIG. 1, the authentication server 130 may transmit the authentication success result to the service server providing a payment service. When the authentication is successful, the service server may approve a money transfer between the users.

Figure 2:
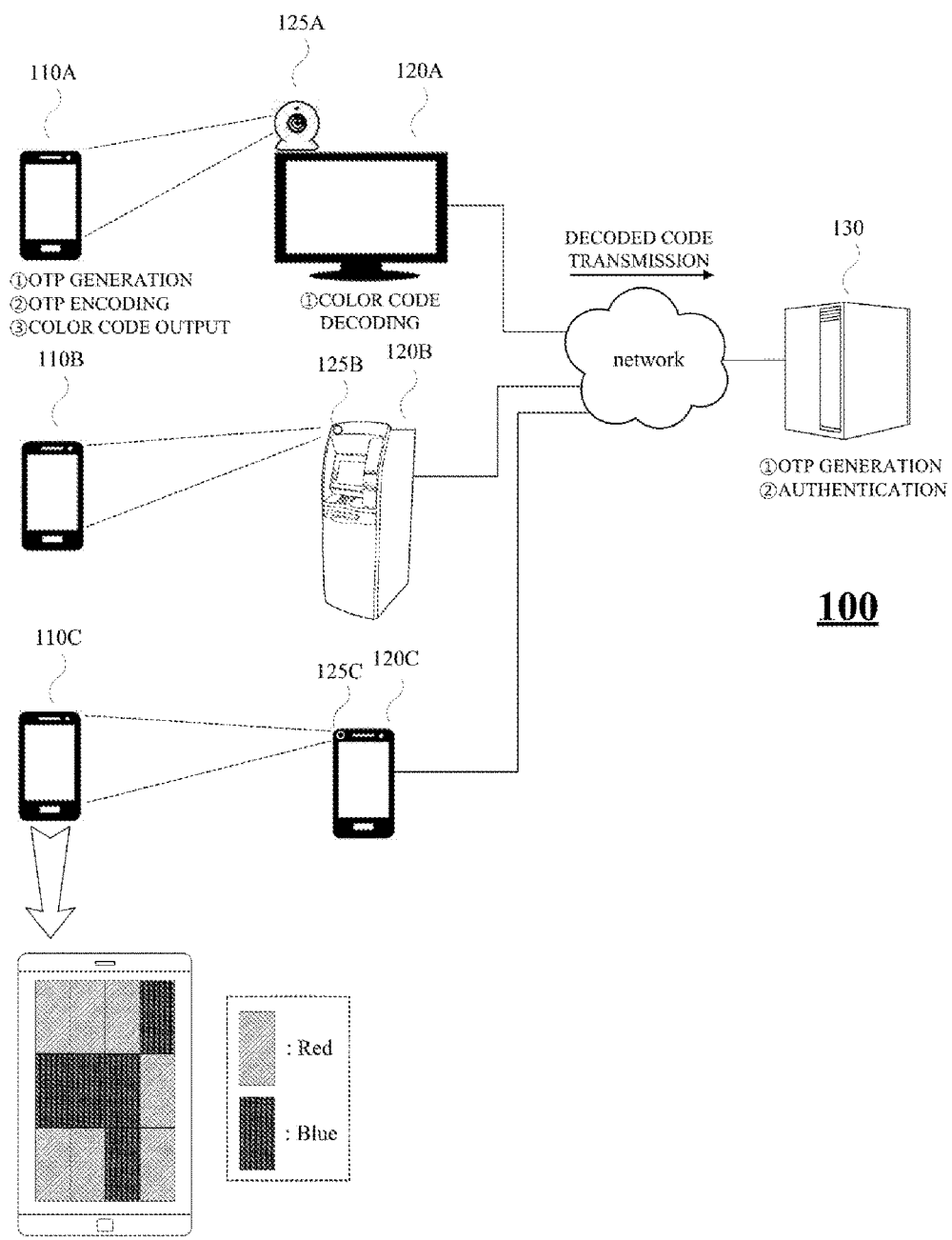
FIG. 2 is a block diagram illustrating an embodiment of a configuration of an OTP authentication system using a color code.

FIG. 2 is a block diagram illustrating an embodiment of a configuration of the OTP authentication system 100 using a color code. The OTP authentication system 100 shown in FIG. 2 may have the same configuration as the OTP authentication system 100 shown in FIG. 1. However, in FIG. 2, the computer device 120 may obtain a screen of the OTP terminal 110 through a camera 125, further process the image data, extract a color code, and decode the color code.

The computer devices 120A, 120B, and 120C may obtain the screens of the OTP terminals 110A, 110B, and 110C using the cameras 125A, 125B, and 125C, respectively. In FIG. 2, the computer devices 120A, 120B, and 120C may extract a region in which the color code is displayed from the obtained image, and decode the color code into a series of binary numbers which is constant. Accordingly, the computer devices 120A, 120B, and 120C may store data for decoding the color code (for example, a code conversion table or the like). In FIG. 2, the computer devices 120A, 120B, and 120C may decode the color code and transmit the decoded code to the authentication server 130. The authentication server 130 may perform authentication by comparing the generated OTP and the decoded code.

Figure 3A:
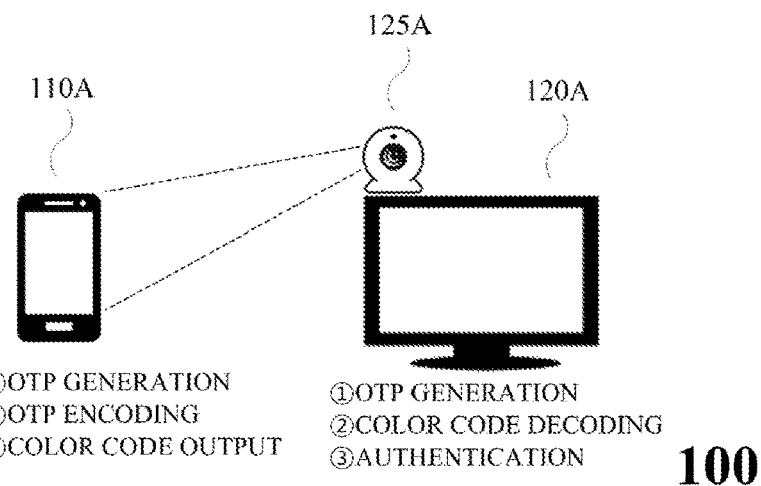
FIGS. 3A-3C are a block diagrams illustrating an embodiment of a configuration of an OTP authentication system using a color code.
Figure 3B:
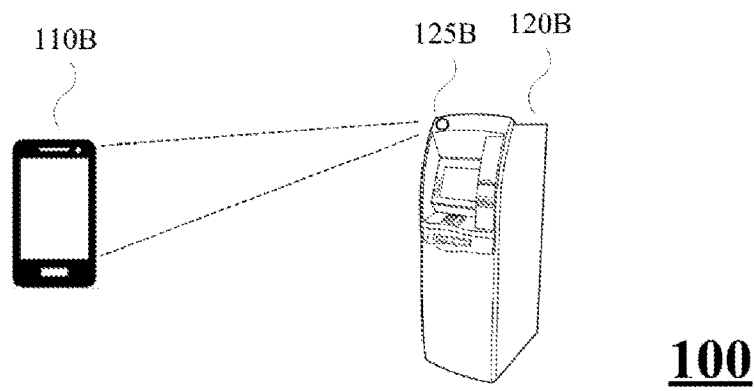
Figure 3C:
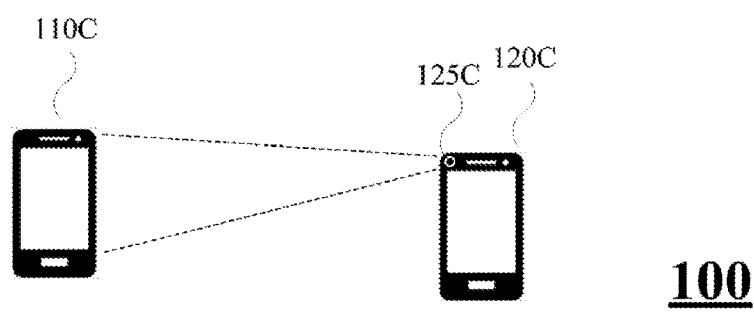

FIG. 3 is a block diagram illustrating an embodiment of a configuration of the OTP authentication system 100 using a color code. Unlike the authentication server 100 shown in FIG. 1, the authentication server 130 may not be included in FIG. 3. In FIG. 3, the computer devices 120A, 120B, and 120C may perform a function of the authentication server 130 shown in FIG. 1. In FIG. 3, the computer devices 120A, 120B, and 120C may first generate an OTP using the same time variable (time period) as the OTP terminals 110A, 110B, and 110C. In FIG. 3, the computer devices 120A, 120B, and 120C may obtain the screens of the OTP terminals 110A, 110B, and 110C through the cameras 125A, 125B, and 125C. In FIG. 3, the computer devices 120A, 120B, and 120C may extract a region on which the color code is displayed in the obtained image, and decode the color code into a series of binary numbers. Further, in FIG. 3, the computer devices 120A, 120B, and 120C may perform authentication by comparing the decoded series of binary numbers (OTPs transmitted by the OTP terminal) and the generated OTP.

Figure 4:
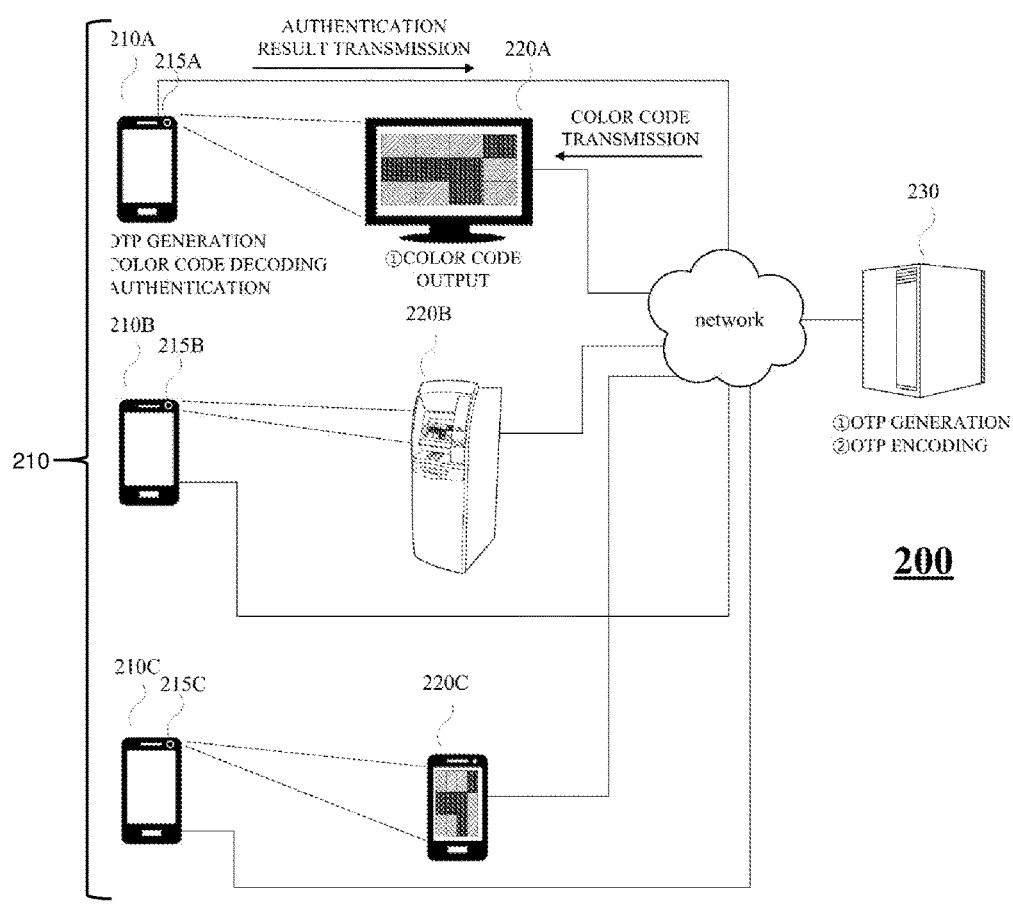
FIG. 4 is a block diagram illustrating an embodiment of a configuration of an OTP authentication system using a color code.

FIG. 4 is a block diagram illustrating an embodiment of a configuration of an OTP authentication system 200 using a color code. The OTP authentication system 200 may display a color code corresponding to an OTP on a display screen through a computer device 220, unlike the OTP authentication system 100 described above, and an OTP terminal 210 used by a user may obtain the color code through a camera 215.

In a first example of the embodiment of FIG. 4, an authentication server 230 may generate an OTP and encode data corresponding to the OTP into a color code. The authentication server 230 may transmit the color code to a computer device 220A through a network. The computer device 220A may display the color code on a display screen. The computer device 220A may be a PC.

The OTP terminal 210A may generate an OTP using the same time period as the authentication server 230. The OTP terminal 210A may obtain the color code displayed on the screen of the computer device 220A through a camera 215A. The OTP terminal 210A may process an obtained image, extract a color code region, and decode the color code. The OTP terminal 210A may perform authentication by comparing series of binary numbers represented by the decoded color code and the generated OTP.

Further, the OTP terminal 210A may transmit an authentication result to the authentication server 230. The OTP terminal 210A may transmit the authentication result not to the authentication server 230 but to a separate authentication service server.

In a second example of FIG. 4, the authentication server 230 may generate an OTP and encode data corresponding to the OTP into a color code. The authentication server 230 may transmit the color code to a computer device 220B through a network. The computer device 220B may display the color code on a display screen. The computer device 220B may be a device such as an ATM device.

An OTP terminal 210B may generate an OTP using the same time period as the authentication server 230. The OTP terminal 210B may obtain the color code displayed on the screen of the computer device 220B through a camera 215B. The OTP terminal 210B may process the obtained image, extract a color code region, and decode the color code. The OTP terminal 210B may perform authentication by comparing series of binary numbers represented by the decoded color code and the generated OTP.

Further, the OTP terminal 210B may transmit the authentication result to the authentication server 230. The authentication server 230 may transmit the authentication result to a service server managed by a bank. Alternatively, the OTP terminal 210B may directly transmit the authentication result to the service server directly managed by the bank.

In a third example of FIG. 4, the authentication server 230 may generate an OTP, and encode data corresponding to the OTP into a color code. The authentication server 230 may transmit the color code to a computer device 220C through the network. The computer device 220C may display the color code on a display screen. The computer device 220C may be a mobile device such as a smart phone.

An OTP terminal 210C may generate an OTP by using the same time period as the authentication server 230. The OTP terminal 210C may obtain the color code displayed on the screen of the computer device 220C through a camera 215C. The OTP terminal 210C may process the obtained image, extract a color code region, and decode the color code. The OTP terminal 210C may perform authentication by comparing series of binary numbers represented by the decoded color code and the generated OTP.

Further, the OTP terminal 210C may transmit the authentication result to the authentication server 230. The OTP terminal 210C may transmit the authentication result not to the authentication server 230 but to a separated service server.

Figure 5:
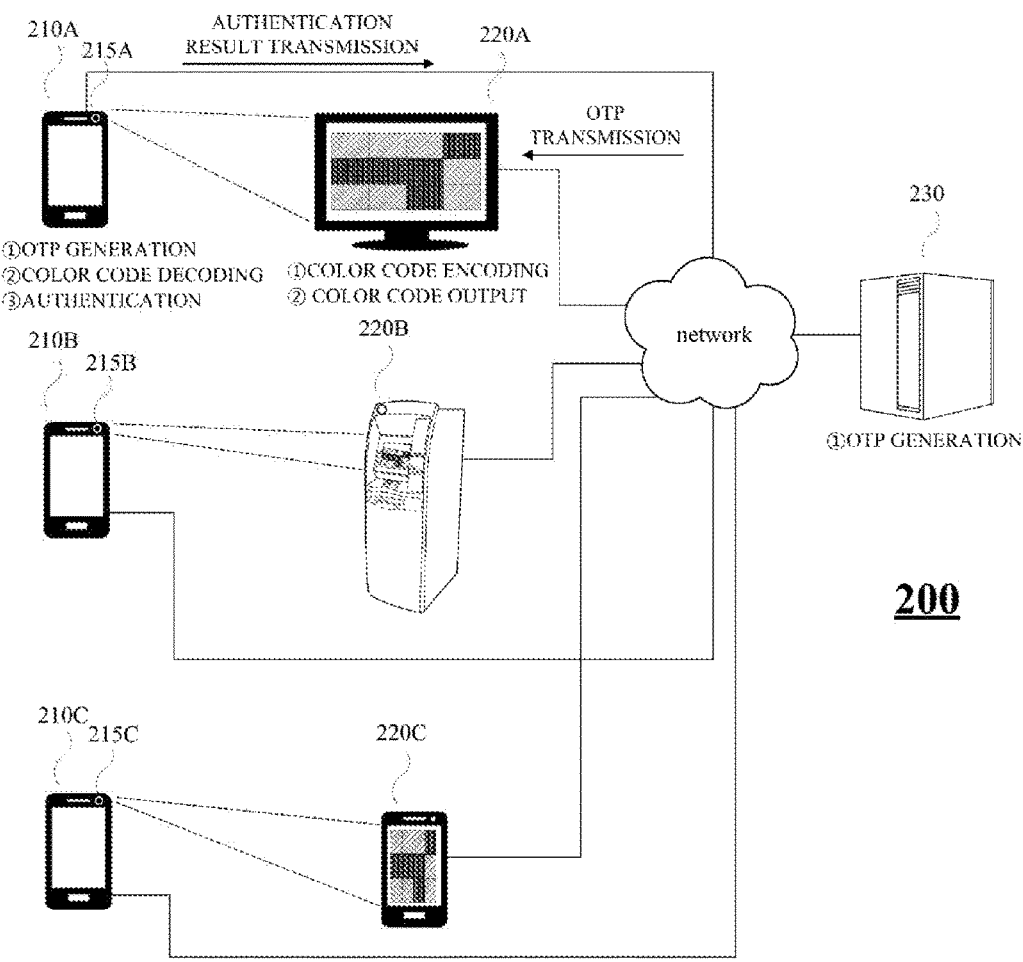
FIG. 5 is a block diagram illustrating an embodiment of a configuration of an OTP authentication system using a color code.

FIG. 5 is a block diagram illustrating an embodiment of a configuration of the OTP authentication system 200 using a color code. The OTP authentication system 200 shown in FIG. 5 may have the same configuration as the OTP authentication system 200 shown in FIG. 4. However, the authentication server 230 shown in FIG. 5 may generate an OTP and transmit the generated OTP to the computer devices 220A, 220B, and 220C. The computer devices 220A, 220B, and 220C may encode the received OTP into a color code and display the color code on their display screens.

The OTP terminals 210A, 210B, and 210C may generate an OTP using the same time period as the authentication server 230. The OTP terminals 210A, 210B, and 210C may obtain the color code displayed on the screens of the computer devices 220A, 220B, and 220C through the cameras 215A, 215B, and 215C. The OTP terminals 210A, 210B, and 210C may process the obtained image, extract the color code, and decode the color code. The OTP terminals 210A, 2106, and 210C may perform authentication by comparing series of binary numbers represented by the decoded color code and the generated OTP.

Further, the OTP terminals 210A, 210B, and 210C may transmit the authentication result to the authentication server 230. The OTP terminals 210A, 210B, and 210C may transmit the authentication result not to the authentication server 230 but to a separate service server.

Figure 6:
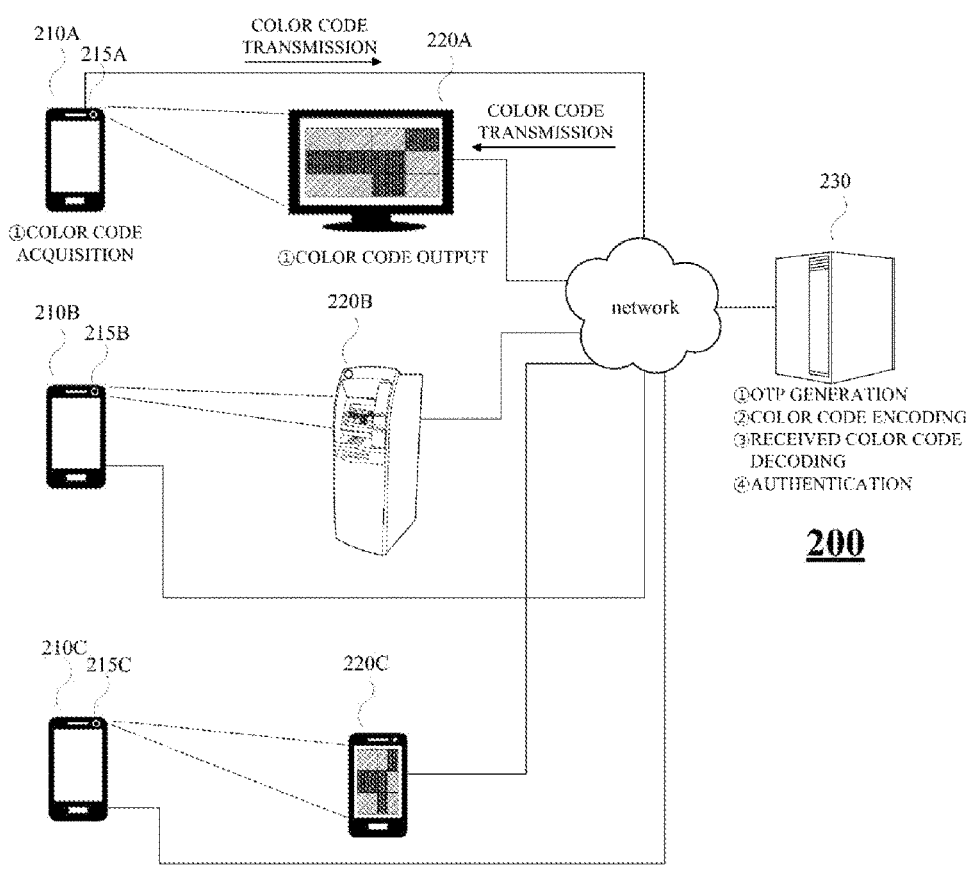
FIG. 6 is a block diagram illustrating an embodiment of a configuration of an OTP authentication system using a color code.

FIG. 6 is a block diagram illustrating an embodiment of a configuration of the OTP authentication system 200 using a color code.

In FIG. 6, the authentication server 230 may generate an OTP and encode the generated OTP into a color code. After this, the authentication server 230 may transmit the color code to the computer devices 220A, 220B, and 220C. The computer devices 220A, 220B, and 220C may display the received color code on their own display screens. The OTP terminals 210A, 210B, and 210C may obtain the color code displayed on the screens of the computer devices 220A, 220B, and 220C through the cameras 215A, 215B, and 215C. The OTP terminals 210A, 210B, and 210C may transmit the received color code to the authentication server 230. In this case, the OTP terminals 210A, 210B, and 210C may transmit images themselves including the screens of the computer devices 220A, 220B, and 220C to the authentication server 230. Further, the OTP terminals 210A, 210B, and 210C may transmit only color code regions to the authentication server 230 after extracting the color code regions in the images including the screens of the computer devices 220A, 220B, and 220C (performing image processing).

The authentication server 230 may decode the color code received from the OTP terminals 210A, 210B, and 210C. The authentication server 230 may perform authentication by comparing contents generated by decoding the color code and the generated OTP. Although not shown in FIG. 6, the authentication server 230 may transmit the authentication result to a service server providing a payment service or the like.

Figure 7:
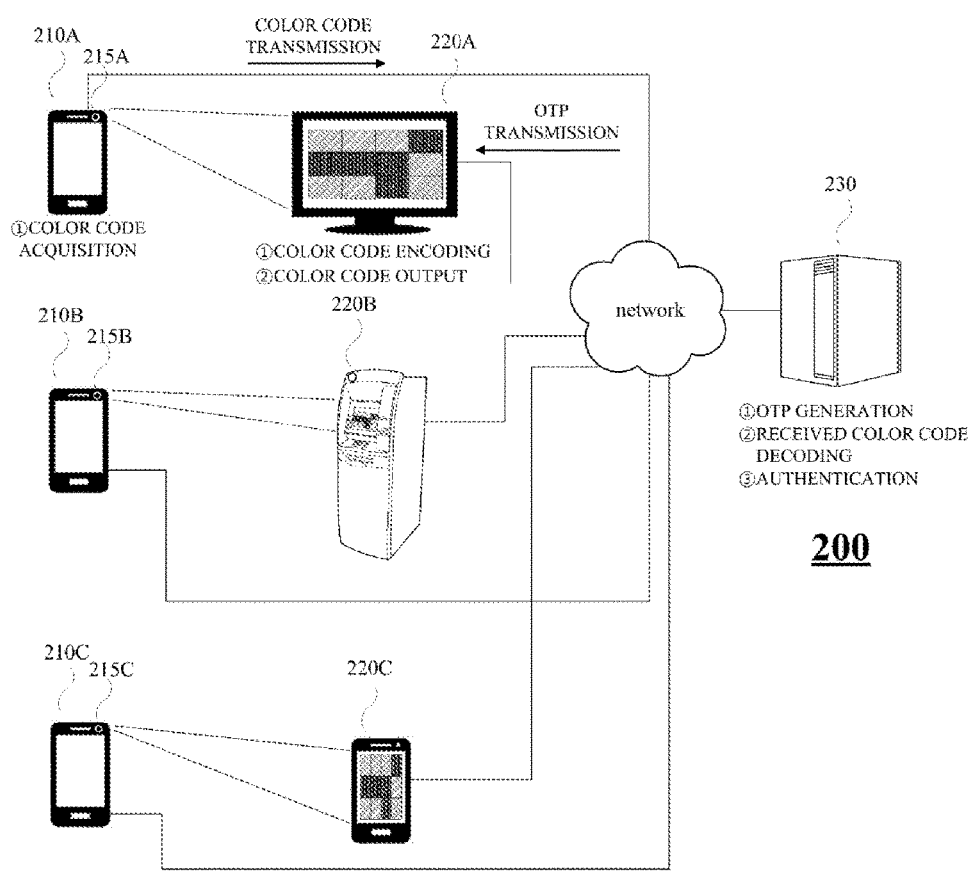
FIG. 7 is a block diagram illustrating an embodiment of a configuration of an OTP authentication system using a color code.

FIG. 7 is a block diagram illustrating an embodiment of a configuration of the OTP authentication system 200 using a color code. The OTP authentication system 200 shown in FIG. 7 may have the same configuration as the OTP authentication system 200 shown in FIG. 6. The authentication server 230 may generate an OTP and transmit the generated OTP to the computer devices 220A, 220B, and 220C. However, the computer devices 220A, 220B, and 220C may encode the OTP into a color code, and display the color code on their own display screens. In FIG. 7, the remaining components and operations may have the same configurations and operations as those of the OTP authentication system 200 shown in FIG. 6.

Figure 8:
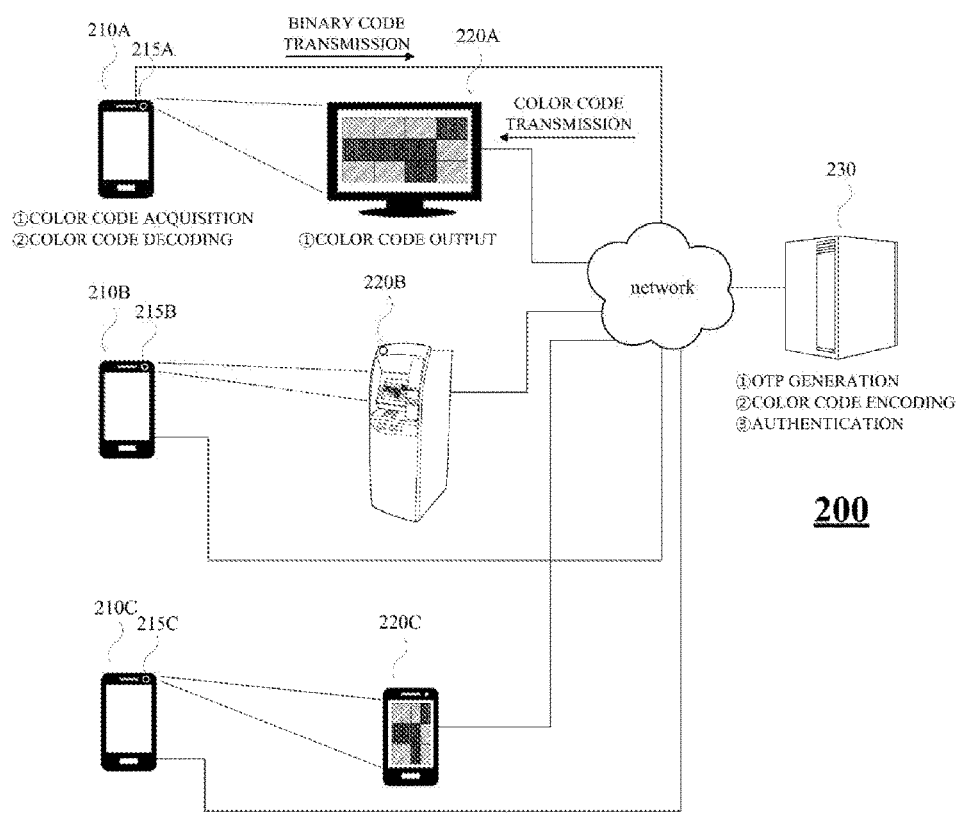
FIG. 8 is a block diagram illustrating an embodiment of a configuration of an OTP authentication system using a color code.

FIG. 8 is a block diagram illustrating an embodiment of a configuration of the OTP authentication system 200 using a color code. The OTP authentication system 200 shown in FIG. 8 may have the same configuration as the OTP authentication system 200 shown in FIG. 6. However, the OTP terminals 210A, 210B, and 210C may obtain screens displayed by the computer devices 220A, 220B, and 220C, extract a color code region through an image processing, and decode a color code using the extracted region. The OTP terminals 210A, 210B, and 210C may decode the color code and generate a binary code corresponding to the color code. The OTP terminals 210A, 210B, 210C may transmit the generated binary code to the authentication server 230. The authentication server 230 may perform authentication by comparing the received binary code and the generated OTP. In FIG. 8, the remaining components and operations may have the same configurations and operations as those of the OTP authentication system 200 shown in FIG. 6.

Figure 9:
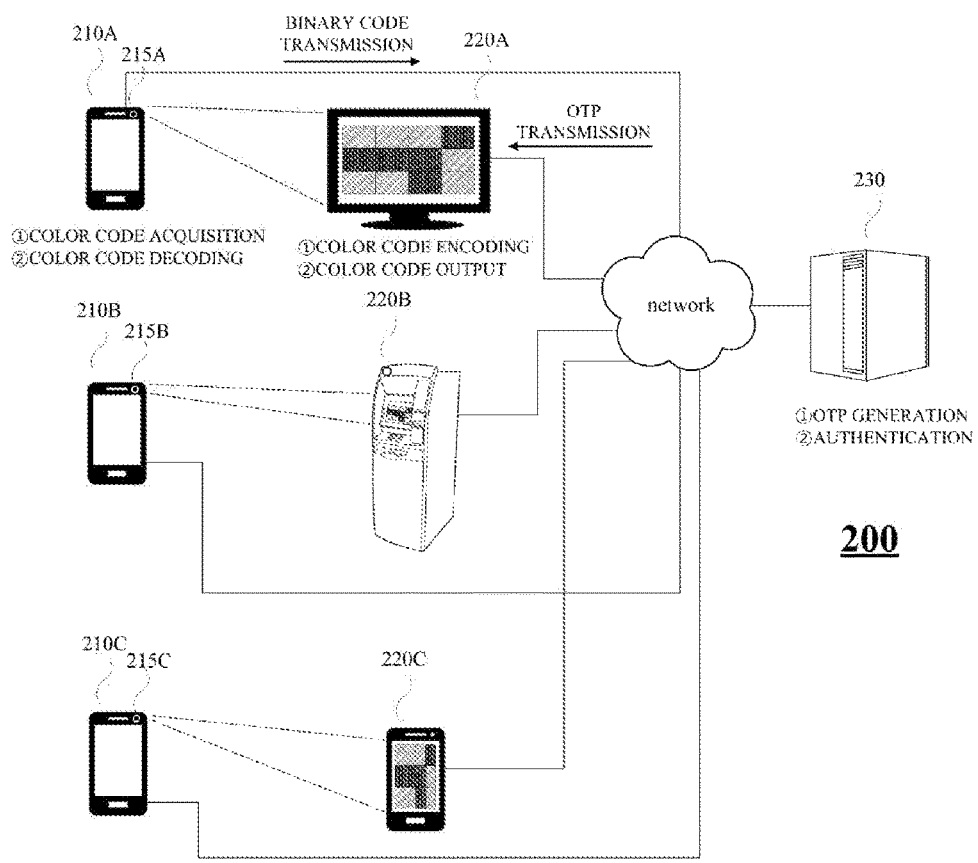
FIG. 9 is a block diagram illustrating an embodiment of a configuration of an OTP authentication system using a color code.

FIG. 9 is a block diagram illustrating an embodiment of a configuration of the OTP authentication system 200 using a color code. The OTP authentication system 200 shown in FIG. 9 may have the same configuration as the OTP authentication system 200 shown in FIG. 8. However, the authentication server 230 may generate an OTP and transmit the generated OTP to the computer devices 220A, 220B, and 220C. The computer devices 220A, 220B, and 220C may encode the OTP into a color code, and display the color code on their own display screens. In FIG. 9, the remaining components and operations may have the same configurations and operations as those of the OTP authentication system 200 shown in FIG. 8.

Figure 10:
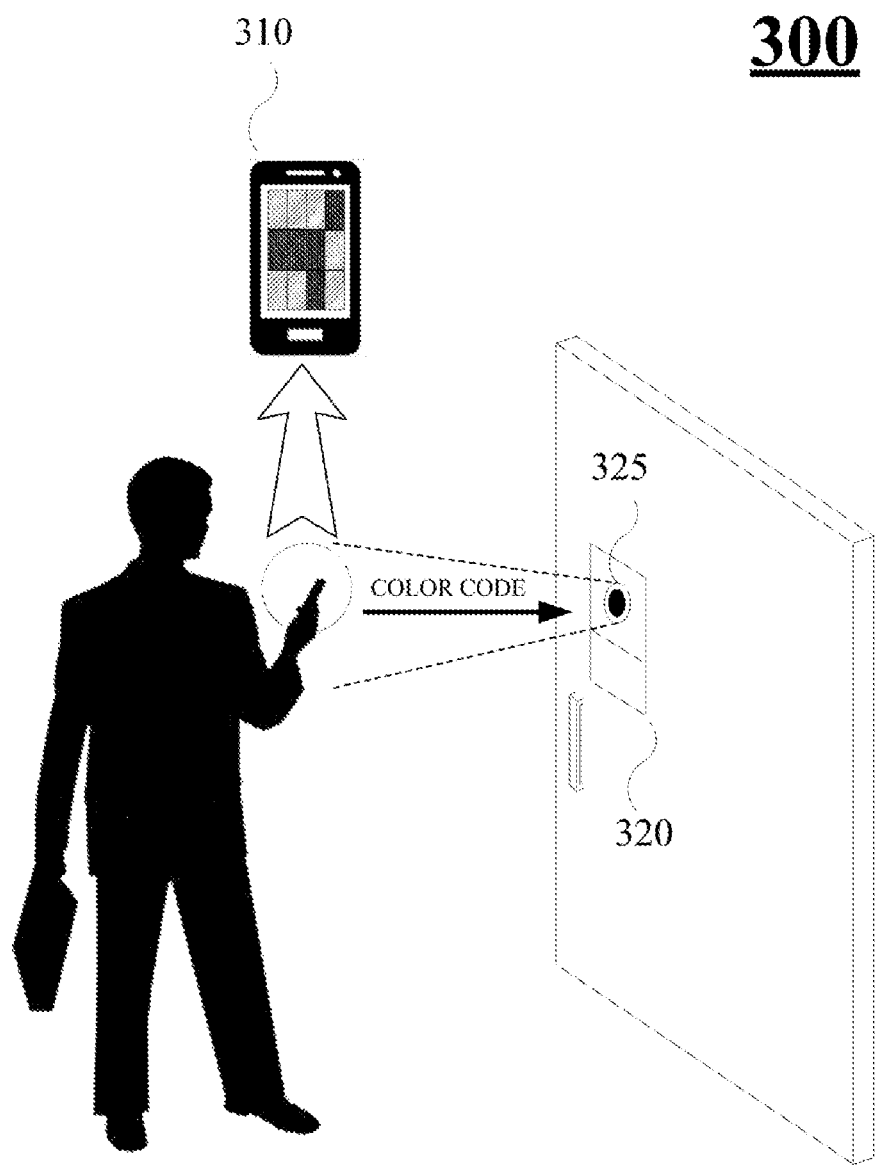
FIG. 10 is a block diagram illustrating an embodiment of a configuration of a door lock authentication system using a color code.

FIG. 10 is a block diagram illustrating an embodiment of a configuration of a door lock authentication system 300 using a color code. FIG. 10 illustrates a door lock system performing authentication using an OTP. An OTP terminal 310 of a user may transmit a color code of a door lock device 320, and the door lock device 320 may perform authentication based on the color code. The door lock device 320 may control opening or closing of a door when the authentication is successful.

The OTP terminal 310 may generate an OTP, encode the OTP into a color code, and display the color code on a display screen. The door lock device 320 may generate an OTP using the same time period as the OTP terminal 310. The door lock device 320 may obtain the screen of the OTP terminal 310 through a camera 325 and extract the color code in image data. The door lock device 320 may decode the color code, and perform authentication by comparing the decoded data and the OTP generated. Further, although not shown in FIG. 10, the door lock device may be connected to a separate authentication server through a network like FIG. 1.

Moreover, the door lock system may also perform user authentication according to various examples of the embodiments shown in FIGS. 1 to 9.

Now, an embodiment of converting an OTP generated by an OTP terminal into a color code will be described. An operation of converting an OTP into a binary number is needed. For example, when a value of the OTP is a decimal number "123456", a value obtained by converting the OTP into a binary number is "000111110001001000000"(123456). The value may be converted into a color code as it is. Further, each digit of the value of the OTP which is a 6-digit decimal number may be converted into a 4-bit binary number, and the converted binary number may be converted into a color code. For example, a result obtained by converting each digit of "123456" into a binary number may be 0001(1), 0010(2), 0011(3), 0100(4), 0101(5), and 0110(6).

An operation of converting an OTP which is a 6-digit number into a binary code or encoding the binary code into a color using any method is needed. A method of encoding a binary code into a color code may vary. The simplest method may be a method of representing the binary number as different colors. That is, "0" may be represented as a first color, and "1" may be represented as a second color. For example, a color corresponding to "0" may be red (RGB values of 255, 0, 0), and a color corresponding to "1" may be blue (RGB values of 0, 0, 255).

FIG. 11 illustrates an embodiment of a screen outputting a color code in a user terminal. Assume that the OTP is "123456". Since a binary code is configured as a binary number having a series of sequences, a rule regarding any sequence of outputting a color code corresponding to a binary code on code regions of a screen may be predetermined. The sequence in which the color codes are output in the code regions may be shared by the OTP terminal 110 and the authentication server 130. The region in which the color code is output on the display screen may be referred to as the code region. In FIG. 11, the code regions may have a shape in which the screen is divided into squares. A square configuring a code region may be referred to as one block.

FIG. 11A is an embodiment in which a series of binary numbers "000111110001010000000" obtained by converting the value of the OTP into a binary number is displayed as the color code. "0" is represented in red, and "1" is represented in blue. A sequence in which the color code is output may start from a leftmost side block of an upper portion of the display screen, a block located on the right side in the same row may display a subsequent binary number, and a leftmost side block of a column located directly below a rightmost side block may display a subsequent binary number. In FIG. 11, numbers in the same row represent a sequence of the color code. FIG. 11A, four blocks located in one row display four-bits, and 20-bits may be displayed since there are five rows. Accordingly, the binary number corresponding to "123456" may be displayed in one frame.

FIG. 11B is an example in which "123456", which is the value of the OTP, is converted into a four-bit binary number according to each digit, and the converted four-bit binary number is displayed as the color code. In FIG. 11B, there are six four-bit rows. "1", "2", "3", "4", "5" and "6" may be sequentially displayed in a downward direction from an uppermost row.

There may be another method of displaying a binary code as a color code. For example, the method may divide a binary code into a plurality of binary number units, and match a divided binary number and one color. FIG. 11C illustrates a result obtained by dividing the binary code "000111110001010000000" corresponding to the value of the OTP "123456" in units of two-digit binary numbers and matching divided binary numbers and colors.

When dividing "000111110001010000000" in units of two-digit binary numbers, "00/01/11/10/00/10/01/00/00/00" may be obtained. FIG. 11C illustrates a result obtained by dividing the binary code in units of two-digit binary numbers and matching 00 to red, 01 to blue, 10 to green, and 11 to black.

Figure 12A:
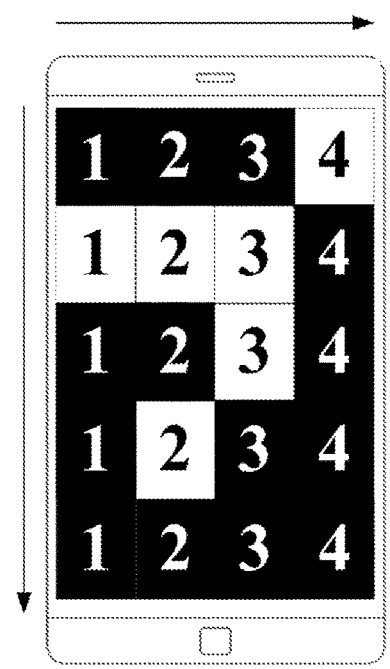
FIGS. 12A and 12B illustrates an embodiment of screens outputting color codes in a user terminal.
Figure 12B:
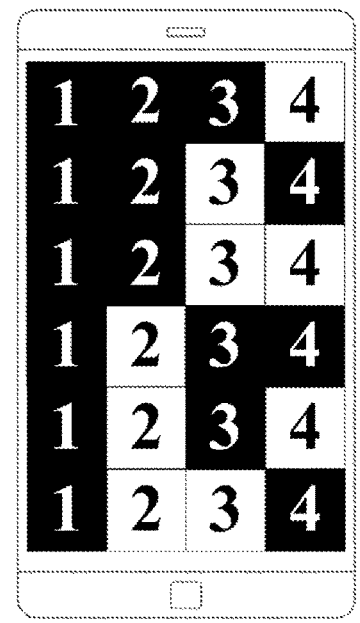

FIG. 12 illustrates an embodiment of a screen outputting a color code in a user terminal. FIGS. 12A and 12B correspond to the examples of FIGS. 11A and 11B, however, embodiments are not limited thereto. However, an example in which colors representing binary numbers are different is illustrated. A color corresponding to 0 is black, and a color corresponding to 1 is white. For example, when the display screen used by the OTP terminals 110 and 210 or the computer devices 120 and 220 is not able to display a color image, a black-and-white image may be used. In this case, the display device uses a black-and-white liquid crystal display (LCD) screen.

An operation in which an image including a screen on which a color code is displayed is processed and the color code is extracted will be described. As described above, each of the OTP terminal 110, the computer device 120, and the authentication server 130 may process the image and decode the color code. However an example in which the authentication server 130 processes the image and decodes the color code will be described for convenience of explanation. The OTP terminal 110 or the computer device 120 may also perform the same operation.

Figure 13:
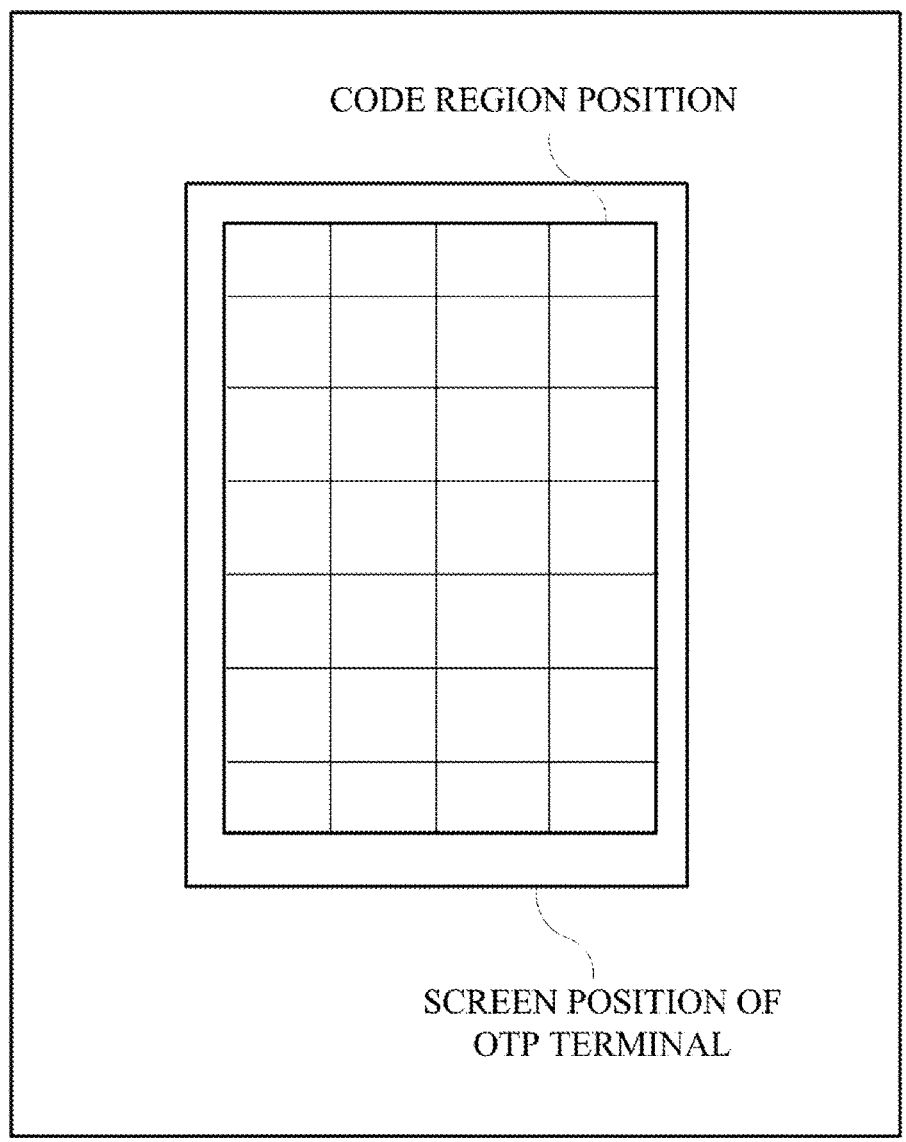
FIG. 13 illustrates an example of a separate screen for designating a position of a user terminal.

Hereinafter, an operation of extracting a color code and decoding a corresponding color code into a series of binary numbers by the authentication server 130 will be described. In FIG. 1, a color code displayed on the screen of the OTP terminal 110 may be obtained through the computer device 120. In some cases, in order to extract a precise color code, the computer device 120 may guide a position of the OTP terminal 110 through its own display screen. FIG. 13 illustrates an embodiment of a separate screen for guiding a position of a user terminal. The screen shown in FIG. 13 may be displayed on the display device of the computer device 120 capturing the screen of the OTP terminal 110 using the camera 125. For example, there is a square guiding the position of the screen of the OTP terminal 110 on the screen, and a grid corresponding to code regions displayed on the display screen of the OTP terminal may be output in a square corresponding to the screen of the OTP terminal. The user may position the OTP terminal 110 at a precise position by referencing the screen shown in FIG. 13 in a state in which the user possesses the OTP terminal 110. A block represented as a grid shown in FIG. 13 may be referred to as a cell. When the user precisely locates the OTP terminal 110, one cell may correspond to one block in which the color code is displayed on the screen of the OTP terminal 110.

Further, a guide screen shown in FIG. 13 may be displayed in the OTP terminal 210 in the examples shown in FIGS. 4 to 9.

An image processing operation performed by the authentication server 130 will be briefly described. For convenience of explanation it is assumed that only red and blue are used as the color code. First, image data may be converted from an RGB color space into a hue, saturation, value (HSV) color space. The reason for converting the color space is to minimize an effect due to noise (ambient light or sunlight, etc.) generated in a process of obtaining a screen of the OTP terminal 110 through the camera 125.

After this, the authentication server 130 may distinguish the color in units of cells generated by dividing the image data into predetermined regions. The authentication server 130 may (1) generate a mask image using the image data, (2) perform a bitwise AND operation on an original image and the mask image, and finally (3) determine a color having a largest portion in pixels inside a cell to be a color of a corresponding cell.

For example, a predetermined threshold may be previously set in order to recognize red or blue, and the color of the image included in the cell may be identified based on a color value of a pixel included in a current cell.

In an HSV color space, (i) H may have a range of [0, 360] (unit: °), (ii) S may have a range of [0, 100] (unit: %), and (iii) V may have a range of [0, 100] (unit: %). For example, the predetermined range may be H: 0~80, S: 50~100, and V: 50~100 in the case of red, and the predetermined range may be H: 180~240, S: 180~240, and V: 50~100 in the case of blue.

The authentication server 130 may divide the color in units of cells (in units of pixels in the cell) dividing the image using the predetermined range. For example, when the color corresponding to a specific cell is included in the range of red, the authentication server 130 may set a value for a corresponding cell as 255 (when representing a value for each cell as 8-bit). The authentication server 130 may generate a mask image by performing the operation described above in units of cells dividing the image. The authentication server 130 may generate a mask image for blue by performing the same operation.

After this, the authentication server 130 may perform a bitwise AND operation in units of cells using the mask image and a source image. Supposing that a and b are binary numbers, the bitwise AND operation of a and b is a·b=0 when a is 0 and b is 0, the bitwise AND operation of a and b is a·b=0 when a is 1 and b is 0 or a is 0 and b is 1, and the bitwise AND operation of a and b is a·b=1 when a is 1 and b is 1. In this operation, the symbol "·" represents the bitwise AND operation of a and b. For example, when performing the bitwise AND operation on a mask image having a red component and the source image, only a region corresponding to red in the source image may be displayed and the remaining regions may be displayed in black. A result of the bitwise AND operation on the mask image and the source image may be obtained by performing the same operation for blue.

Since a color detection using the bitwise AND operation is performed not in units of pixels but in units of cells, it may be necessary to recognize the number of color values included in the cell in units of pixels in order to precisely detect the color. For example, supposing that there are 30 pixels in one cell, the number of pixels having an HSV value recognized as red is 13 and the number of pixels having an HSV value recognized as blue is 17, the color of the cell may be recognized as blue. Through this operation, the authentication server 130 may determine the color value in units of cells dividing the image. After this, the authentication server 130 may decode the image into a binary sequence using the determined color.

Of course, the computer device 120 may not display the guide screen guiding a position of the terminal shown in FIG. 13. In this case, the computer device 120 may obtain a screen of the OTP terminal 110 and transmit the obtained screen to the authentication server 130 as it is, and the authentication server 130 may decode the color code after detecting a color code region in a received frame through the image processing operation.

Figure 14:
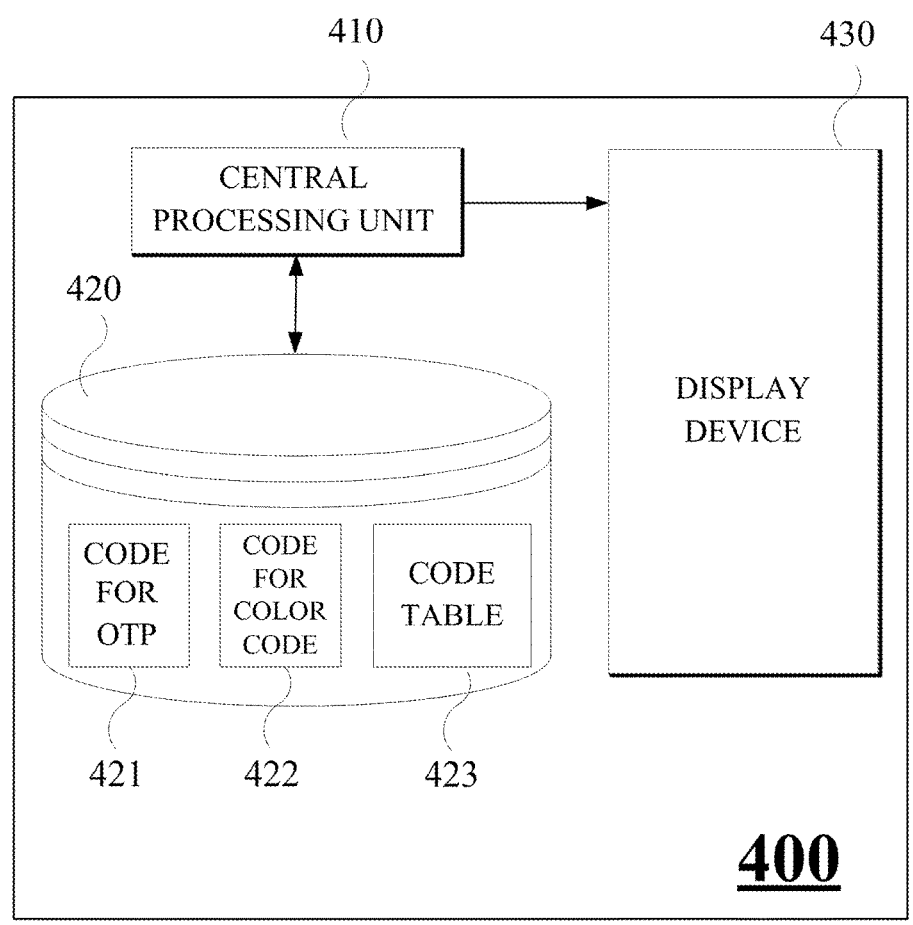
FIG. 14 is a block diagram illustrating an example of a configuration of an OTP terminal.

FIG. 14 is a block diagram illustrating an embodiment of a configuration of an OTP terminal 400. A storage device 420 may store a code for generating an OTP 421, a code for encoding a color code 422, and a code table 423 used for encoding the color code. The code table may be a table including a color which matches a binary number or a binary sequence. The code table may be data which is previously determined for matching the binary number or the binary sequence to a specific color.

The storage device 420 may be a flash memory included in the OTP terminal 400, a flash memory (for example, a secure digital (SD) card or the like) connected to the OTP terminal 400, or an external memory device (a hard disk, a solid state drive (SSD), etc.) included in or connected to the OTP terminal 400. Further, the storage device 420 may be a server connected through a communication module (not shown) of the OTP terminal 400.

A central processing unit (CPU) 410 may be a device processing a calculation or the like. The CPU 410 may generate an OTP using the code for generating the color code 421. The CPU 410 may encode the OTP into a predetermined color code using the code for encoding the color code 422 and the code table 423. The CPU 410 may transmit a signal corresponding to the color code to a display device 430. The display device 430 may display the color code on a screen.

Figure 15:
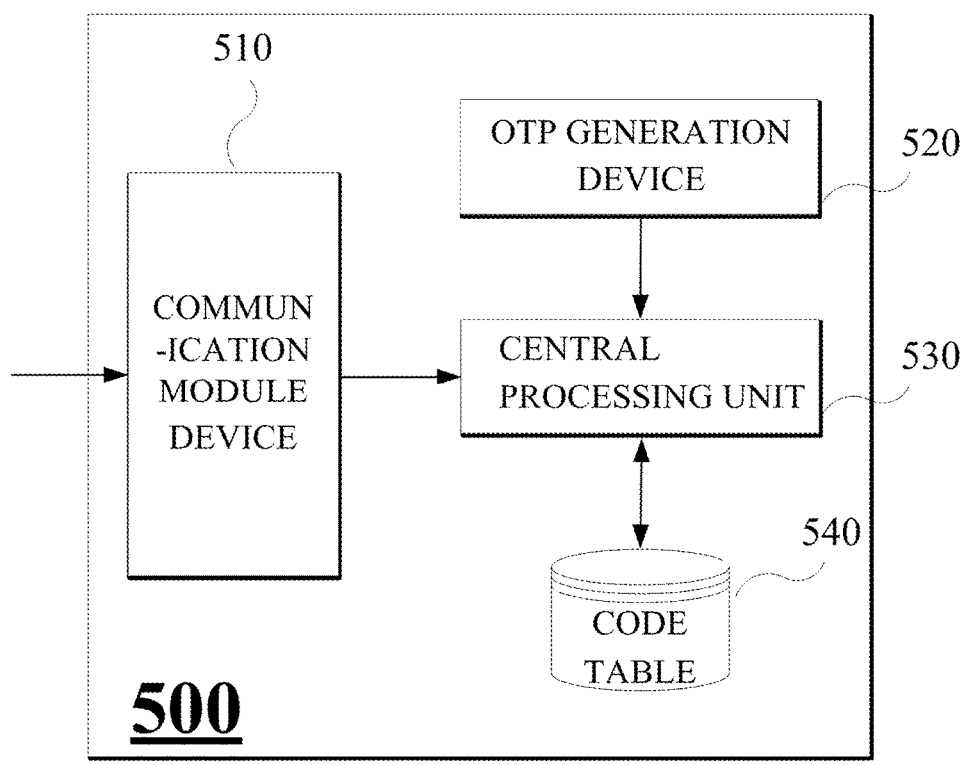
FIG. 15 is a block diagram illustrating an example of a configuration of an OTP server.

FIG. 15 is a block diagram illustrating an embodiment of a configuration of an OTP server 500 using a color code. The OTP server 500 may include an OTP generation device 520 generating an OTP based on a referenced time, a communication module device 510 receiving an image generated by obtaining a display screen on which a color code is displayed, a storage device 540 storing a code table including a color matching a binary number or a binary sequence, and a CPU 530 extracting the color code from the image, converting the color code into a series of binary codes using the code table, and performing authentication based on whether the series of binary codes correspond to the OTP.

As described above, the CPU 530 may extract the color code from the image. The CPU 530 may decode the color code into a series of binary numbers based on the code table stored in the storage device 540. The CPU 530 may convert the series of binary numbers into a decimal number. This operation may correspond to the operation of converting an OTP which is a decimal number into a series of binary numbers by the OTP terminal 110. The CPU 530 may previously generate the TOTP described above using a secret key of the OTP and a time (a time period) of the OTP as a parameter like the OTP terminal for verification of the OTP. The time used for generating the OTP may be the same as that of the OTP terminal 110. A detailed description of an operation in which the OTP terminal 110 and the authentication server 130 synchronize time (the time period) will be omitted. Finally, the CPU 530 may determine whether the generated OTP and the decimal number obtained by decoding the color code match. The authentication may be determined as successful when both values are the same, but the authentication may be determined as failed when both values are different.

As described above, the OTP terminal 110 and the authentication server 130 may share several variables for generating an OTP. The most important variable among the variables may be a time generating the OTP. The OTP terminal 110 and the authentication server 130 may share the time (the time period) used for generating the OTP without communicating. Accordingly, the time which is a factor shared by the OTP terminal 110 and the authentication server 130 may be used in a process of transmitting a color code. For example, the time may be divided into several periods. For example, 1 to 30 seconds may be divided as a period A, and 31 to 60 seconds may be divided as a period B. Alternatively, the time may be divided into several groups based on seconds using a predetermined hash function. The time may be divided based on minutes or time. This is because the OTP terminal 110 and the authentication server 130 have individual timers and are able to determine the time. Of course, the OTP terminal 110 and the authentication server 130 may need to synchronize their times. That is, the OTP terminal 110 and the authentication server 130 may share times which are variables without communicating with each other through a network. The times, which are variables, may be used for not only the generation or authentication of an OTP but also for the operation of converting the generated OTP into a color code or the operation of displaying the color code on a screen.

A detailed embodiment will be described hereinafter. It is assumed that the time period has two types (A and B) for convenience of explanation.

First, a color configuring a color code according to a time period may be changed. FIG. 16 illustrates an embodiment of a code table in which a binary code and a color code are matched. FIG. 16A illustrates an example in which one digit of the binary number is represented as red or blue. In the time period A, "0" is represented as red and "1" is represented as blue. In the time period B, "0" is represented as blue and "1" is represented as red. FIG. 16B illustrates an example in which a color is changed according to the time period when a two-digit binary number is represented as one color. Referring to FIG. 16B, in the time period A, "00" is represented as red, "01" is represented as blue, "10" is represented as green, and "11" is represented as black. In the time period B, "00" is represented as yellow, "01" is represented as white, "10" is represented as purple, and "11" is represented as black. However, the colors shown in FIG. 16 are merely one example.

Figure 17A:
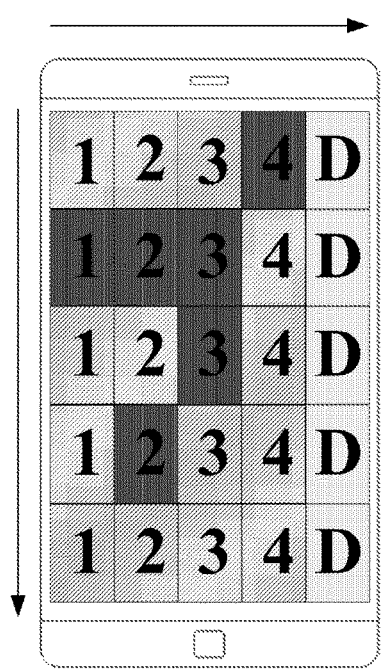
FIGS. 17A and 17B illustrates an embodiment of color codes including a dummy color.
Figure 17B:
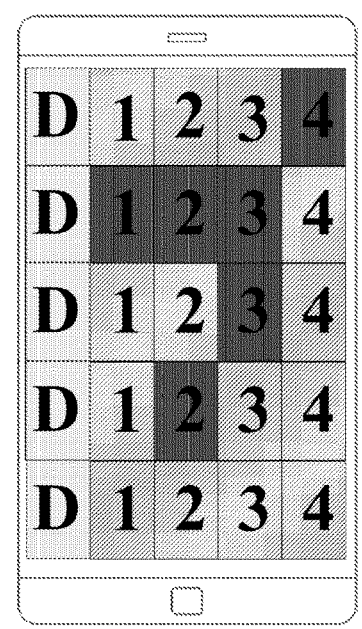

Further, a color which does not represent data in the color code according to the time period may be inserted. The color which is not involved for representing the data may be referred to as a dummy color. FIG. 17 illustrates an embodiment of a color code including a dummy color. FIG. 17A illustrates an example of a screen displaying the color code in the time period A. FIG. 17A is an example in which a dummy color is displayed after four blocks in the display screen. The dummy color may be represented as "D". All five blocks appear to form one unit. FIG. 17B illustrates an example of the screen outputting the color code in the time period B. FIG. 17B is an example in which color blocks actually representing 4 pieces of data are output after first outputting the dummy color.

Figure 18A:
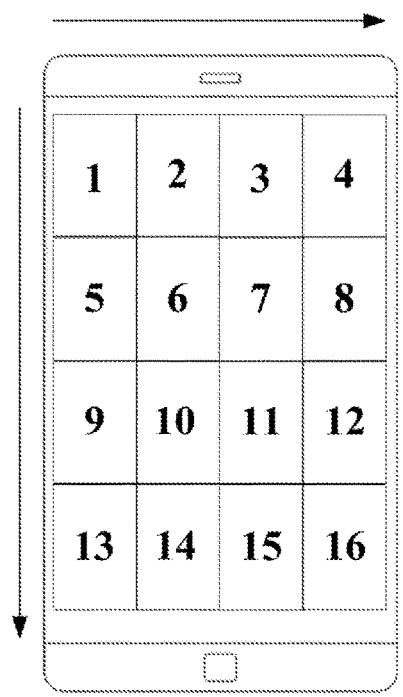
FIGS. 18A and 18B illustrates an embodiment of code regions in which color codes are output.
Figure 18B:
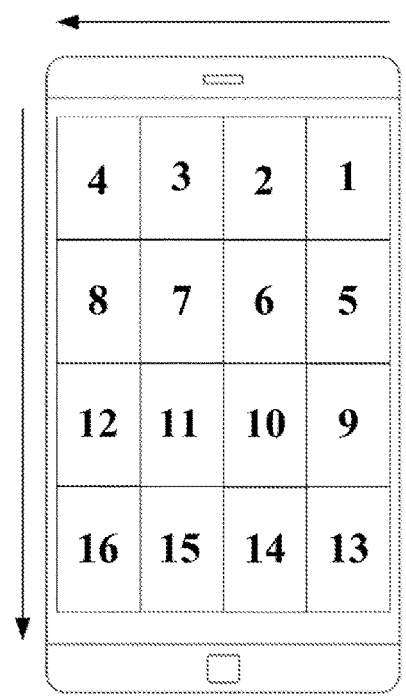

Further, a position or a sequence of the code region in which the color code is displayed may be changed according to the time period. FIG. 18 illustrates an embodiment of a code region in which a color code is displayed. In FIG. 18, a number represented in the code region may refer to a sequence corresponding to a binary number or a plurality of binary number units configuring a binary code. FIG. 18A illustrates a sequence in which the color code is output in the time period A. FIG. 18B illustrates a sequence in which the color code is output in the time period B.

When a color corresponding to the binary number, a position of the dummy color, a position or a sequence of the code region, etc. are changed according to the time period, the OTP terminal 110 and the authentication server 130 should be previously shared factors changed according to the time period.

Figure 19:
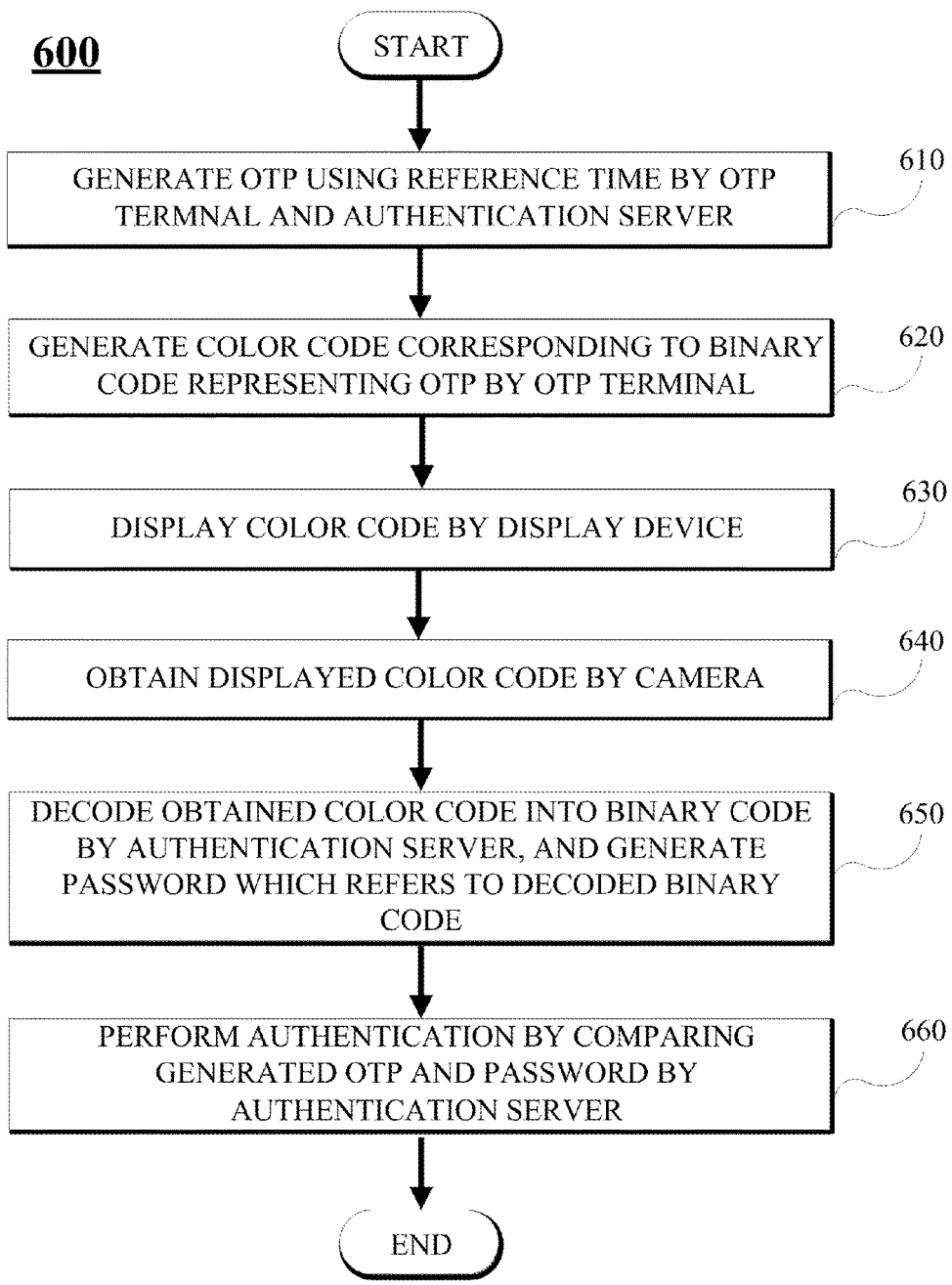
FIG. 19 is a flowchart for describing an embodiment of a method of performing OTP authentication using a color code.

FIG. 19 illustrates an embodiment of a flowchart for describing a method of performing OTP authentication using a color code (600). The method of performing OTP authentication using the color code (600) may include generating an OTP using a reference time by an OTP terminal and a authentication server (610), generating a color code corresponding to a binary code representing the OTP by the OTP terminal (620), displaying the color code by a display device (630), obtaining the displayed color code by a camera (640), decoding the obtained color code into the binary code and generating a password referring to the decoded binary code by the authentication server (650), and performing authentication by comparing the generated OTP and the password by the authentication server (660).

Figure 20:
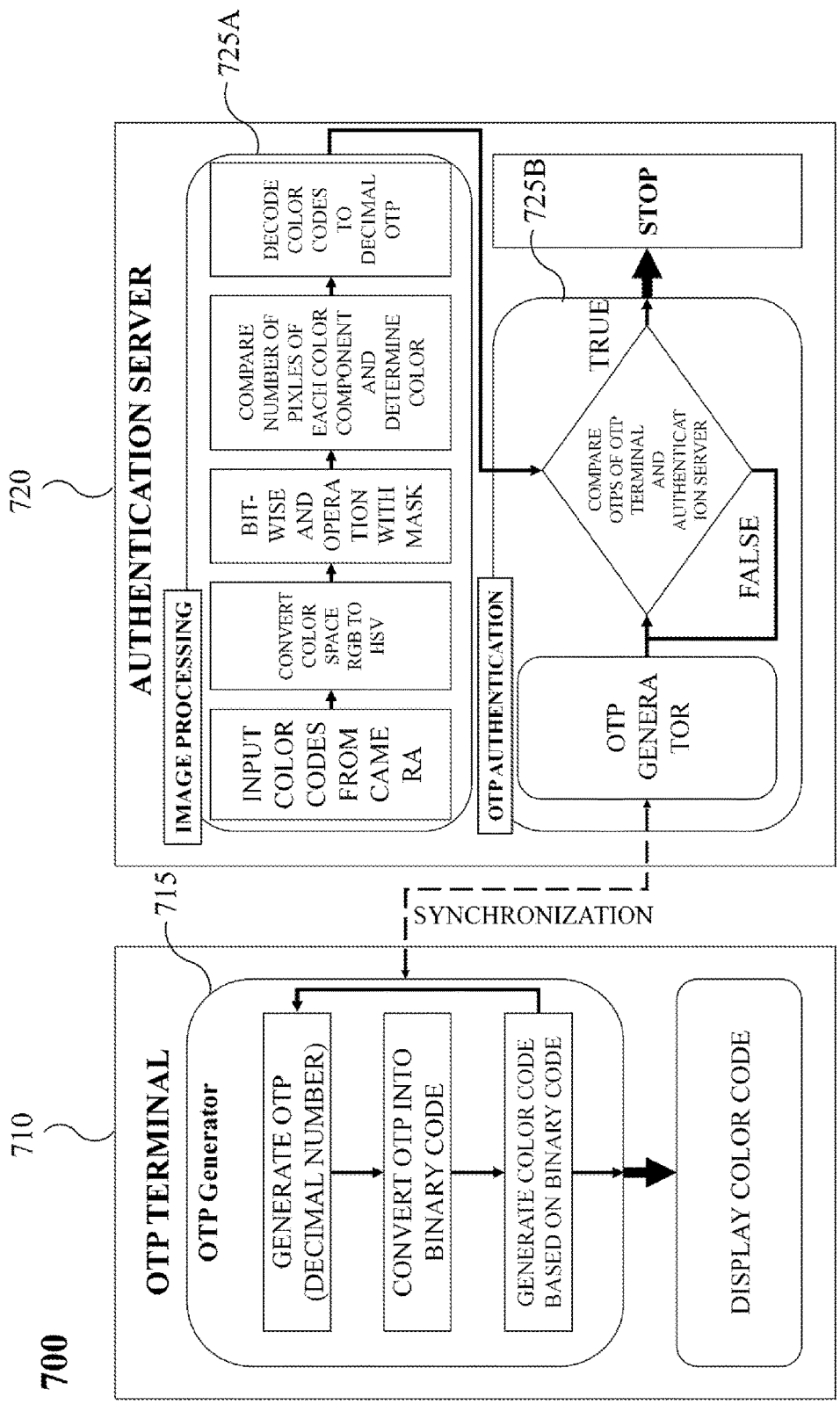
FIG. 20 is a diagram illustrating an embodiment of a method of performing OTP authentication using a color code.

FIG. 20 is an embodiment of a conceptual diagram illustrating a method of performing OTP authentication using a color code 700. FIG. 20 illustrates the flowchart shown in FIG. 19 as a block diagram, and an OTP terminal 710 may generate an OTP which is a decimal number by an internal OTP generator 715, convert the OTP into a binary code, generate a color code corresponding to the converted binary code, and finally display the color code on a display screen of the OTP terminal 710.

Further, the authentication server 720 may perform an image processing operation 725A and an OTP authentication operation 725B to verify the OTP generated by the OTP terminal 710. The image processing operation 725A is the same as described above. The OTP authentication operation 725B may generate an OTP by performing the same operation as the OTP generator 715 of the OTP terminal 710 by the internal OTP generator, and may perform authentication based on whether the OTP detected though the image processing operation 725A and the generated OTP are the same by comparing the detected OTP and the generated OTP.

Technology described above allows a user to more conveniently use an authentication method having high security named an OTP method. Further, the technology described above provides an OTP authentication service through a smart phone of the user without using an exclusive OTP generator.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

As a non-exhaustive example only, a device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing one-time password (OTP) authentication, comprising:
generating, by an OTP terminal and an authentication server, an OTP using a reference time;
generating, by the OTP terminal, a color code corresponding to a binary code representing the OTP;
changing, by the OTP terminal, a color scheme of the color code, in response to the reference time elapsing;
displaying, by a display device, the color code;
obtaining, by a camera, the displayed color code;
determining, by the authentication server, that a user is authenticated, in response to detecting a match between the generated OTP and a password represented by the color code; and
in response to the determining that the user is authenticated, approving a transaction at an ATM machine, approving a credit card transaction, or sending a signal to open or close a door of the ATM machine,
wherein the OTP terminal generates the color code by adding a dummy color at a specific position of the color code based on the reference time, and the authentication server decodes the generated color code into the binary code by considering the dummy color added at the specific position of the color code according to the reference time.

2. The method of claim 1, wherein the color code is configured as a first color corresponding to 0 and a second color corresponding to 1 with respect to a series of binary numbers configuring the binary code.

3. The method of claim 1, wherein the OTP terminal includes a code table in which different colors are matched to binary sequences configured as two-or-more digit binary numbers, respectively, and converts the binary code into the color code using the code table.

4. The method of claim 1, wherein the display device sequentially displays the color code in a predetermined region according to a sequence of characters and a sequence of a binary code configuring the OTP.

5. The method of claim 4, wherein the display device changes a position of a region displaying the color code according to the reference time, and the authentication server decodes the binary code in consideration of the changed position of the region according to the reference time in an image obtained by the camera.

6. The method of claim 1, wherein the authentication server decodes the obtained color code into the binary code based on the reference time.

7. The method of claim 1, further comprising:
generating, by the authentication server, the password by decoding the color code obtained by the camera into the binary code.

8. The method of claim 1, further comprising:
generating, by the display device, the password by decoding the color code obtained by the camera into the binary code.

9. The method of claim 1, wherein the OTP is generated using a HMAC-based cipher generation algorithm that generates a new cryptogram using a key value and a counter value, and truncates a predetermined number of digits after substituting the key value and the counter value into the algorithm.

10. The method of claim 1, wherein the determining that the user is authenticated comprises
detecting a HSV (hue saturation value) for each of pixels included in cells of the obtained color code, and
recognizing respective colors of the pixels based on the HSV.

11. The method of claim 10, wherein the determining that the user is authenticated further comprises
recognizing a color for each of the cells as a most common color, among the recognized colors, in each cell, and
decoding the color code, based on the recognized color, to generate the password.

12. A one-time password (OTP) authentication server, comprising:
an OTP generation hardware processor configured to generate an OTP according to a reference time;
a communication module hardware processor configured to receive an image generated by capturing a display screen on which a color code is displayed;
a storage device configured to store a code table;
a central processing unit (CPU) configured to
detect, for each pixel included in a cell of the image, a Hue Saturation Value (HSV),
recognize a color being present in a maximum number of pixels in each of cells based on the detected HSV,
extract the color code from the image based on the recognized color,
convert the color code into a series of binary codes using the code table, and
determine that a user is authenticated, in response to detecting that a match between the generated OTP and a password represented by the color code,
wherein, in response to the determination that the user is authenticated, the OTP authentication server approves a transaction at an ATM machine, approves a credit card transaction, or sends a signal to open or close a door of the ATM machine,
wherein a color scheme of the color code changes, in response to the reference time elapsing, and
wherein the color code is generated by adding a dummy color at a specific position of the color code based on the reference time, and the CPU decodes the generated color code into the binary code by considering the dummy color added at the specific position of the color code according to the reference time.

13. The OTP authentication server of claim 12, wherein the CPU converts the color code into the binary code while excluding the dummy color located at the specific position of the color code according to the reference time.

14. The OTP authentication server of claim 12, wherein the code table includes information in which the color matching the binary number or the binary sequence is changed according to the reference time.

15. The OTP authentication server of claim 12, wherein the image includes the color code in a predetermined region according to a sequence of characters configuring the OTP and a sequence of a binary code corresponding to the characters.

16. The OTP authentication server of claim 15, wherein the CPU sets a position of the region or a sequence of a region in which the color code is output to be different according to the reference time, and converts the color code into the binary code.

17. The method of claim 12, wherein in response to the determination that the user is authenticated, the OTP authentication server sends a signal to cause the ATM machine to dispense cash.

18. A one-time password (OTP) terminal, comprising:
one or more hardware processors configured to:
generate, along with an authentication server, an OTP using a reference time;
generate a color code corresponding to a binary code representing the OTP;
change a color scheme of the color code, in response to the reference time elapsing; and
obtain, from a camera, a color code displayed on a display device,
wherein the authentication server determines that a user is authenticated, in response to detecting a match between the generated OTP and a password represented by the color code,
wherein in response to the determination that the user is authenticated, a transaction at an ATM machine is approved, a credit card transaction is approved, or a signal is sent to open or close a door of the ATM machine, and
wherein the color code is generated by adding a dummy color at a specific position of the color code based on the reference time, and the authentication server decodes the generated color code into the binary code by considering the dummy color added at the specific position of the color code according to the reference time.

19. The OTP terminal of claim 18, wherein the processor is further configured to use a code table including information in which the color matching the binary number or the binary sequence is changed according to the reference time.

20. The OTP terminal of claim 18, wherein the reference sequence includes a sequence of characters configuring the OTP and a sequence of a binary code corresponding to the characters.

21. The OTP terminal of claim 18, wherein the display device displays a position of the specific region or a sequence of the specific region in which the color code is displayed to be different according to the reference time.

* * * * *